(12) United States Patent
Li et al.

(10) Patent No.: US 12,106,389 B2
(45) Date of Patent: Oct. 1, 2024

(54) DISPATCHING METHOD FOR ELECTRIC-HYDROGEN ENERGY SYSTEM CONSIDERING FLEXIBLE HYDROGEN DEMAND

(71) Applicants: STATE GRID JIANGSU ELECTRIC POWER COMPANY RESEARCH INSTITUTE, Nanjing (CN); STATE GRID JIANGSU ELECTRIC POWER CO., LTD., Nanjing (CN); NANJING WOKESEN ELECTRIC POWER TECHNOLOGY CO., LTD., Nanjing (CN); JIANGSU ELECTRIC POWER RESEARCH INSTITUTE CO., LTD., Nanjing (CN)

(72) Inventors: Qiang Li, Nanjing (CN); Huachun Han, Nanjing (CN); Xiaodong Yuan, Nanjing (CN); Qun Li, Nanjing (CN); Zhi Wu, Nanjing (CN); Yongyong Jia, Nanjing (CN); Chenyu Wu, Nanjing (CN); Zhenhua Lv, Nanjing (CN); Suyang Zhou, Nanjing (CN); Weijia Tang, Nanjing (CN); Shuai Lu, Nanjing (CN); Chenggen Wang, Nanjing (CN)

(73) Assignees: STATE GRID JIANGSU ELECTRIC POWER COMPANY RESEARCH INSTITUTE, Nanjing (CN); STATE GRID JIANGSU ELECTRIC POWER CO., LTD., Nanjing (CN); NANJING WOKESEN ELECTRIC POWER TECHNOLOGY CO., LTD., Nanjing (CN); JIANGSU ELECTRIC POWER RESEARCH INSTITUTE CO., LTD., Nanjing (CN)

( * ) Notice: Subject to any disclaimer, the term of this patent is extended or adjusted under 35 U.S.C. 154(b) by 272 days.

(21) Appl. No.: 17/773,601

(22) PCT Filed: Jul. 12, 2021

(86) PCT No.: PCT/CN2021/105807
§ 371 (c)(1),
(2) Date: Apr. 30, 2022

(87) PCT Pub. No.: WO2022/166114
PCT Pub. Date: Aug. 11, 2022

(65) Prior Publication Data
US 2023/0122201 A1 Apr. 20, 2023

(30) Foreign Application Priority Data

Feb. 8, 2021 (CN) .......................... 202110172092.1
Jul. 2, 2021 (CN) ......................... 202110753545.X

(51) Int. Cl.
*G06Q 50/06* (2024.01)
*G05B 13/04* (2006.01)
*G06F 17/11* (2006.01)

(52) U.S. Cl.
CPC ............ *G06Q 50/06* (2013.01); *G05B 13/04* (2013.01); *G06F 17/11* (2013.01)

(58) Field of Classification Search
CPC ......... G06Q 50/06; G05B 13/04; G06F 17/11; Y02A 30/60; Y02B 10/10; Y02E 10/56;
(Continued)

(56) References Cited

U.S. PATENT DOCUMENTS

2014/0277599 A1 9/2014 Pande et al.
2022/0385064 A1* 12/2022 Cruickshank, III ... G06Q 50/06

FOREIGN PATENT DOCUMENTS

CN 110288152 A 9/2019
CN 110889600 A 3/2020
(Continued)

*Primary Examiner* — Mohammad Ali
*Assistant Examiner* — Saad M Kabir
(74) *Attorney, Agent, or Firm* — SZDC Law PC

(57) ABSTRACT

A dispatching method for an electric-hydrogen energy system considering flexible hydrogen demand includes establishing an electric load flexibility equation, a power purchase and sale constraint equation, a renewable energy output constraint equation, a hydrogen load flexibility equation, an electricity-to-hydrogen production safety operation constraint equation and an electric power balance constraint equation, establishing an electric-hydrogen energy system
(Continued)

dispatching model with the lowest operating cost of the electric-hydrogen energy system within the dispatching cycle as an objective function, and solving the electric-hydrogen energy system dispatching model to obtain an optimal dispatching result. As compared with the prior art, the present invention can effectively solve the problem of coordination between electric and hydrogen energy flows, while taking into account the flexibility of electric and hydrogen loads, further providing additional flexibility to the operation of the system.

3 Claims, 3 Drawing Sheets

(58) Field of Classification Search
CPC ...... H02J 3/00; H02J 3/008; H02J 3/28; H02J 3/381; H02J 15/008; H02J 2203/10; H02J 2203/20; H02J 2300/24
USPC .......................................................... 700/286
See application file for complete search history.

(56) References Cited

FOREIGN PATENT DOCUMENTS

| | | | |
|---|---|---|---|
| CN | 111027846 A | 4/2020 | |
| CN | 111144620 A | 5/2020 | |
| CN | 112952805 A | 6/2021 | |

* cited by examiner

DISPATCHING METHOD FOR ELECTRIC-HYDROGEN ENERGY SYSTEM CONSIDERING FLEXIBLE HYDROGEN DEMAND

This application is the National Stage Application of PCT/CN2021/105807, filed on Jul. 12, 2021, which claims priority to Chinese Patent Application Nos. CN 202110172092.1, filed on Feb. 8, 2021, and CN 202110753545.X, filed on Jul. 2, 2021, all of which are incorporated by reference for all purposes as if fully set forth herein.

TECHNICAL FIELD

The present invention relates to the field of dispatching for a multi-energy flow system, and in particular to a dispatching method for an electric-hydrogen energy system considering flexible hydrogen demand.

BACKGROUND

The electric-hydrogen energy system is a new type of energy system based on electricity-to-gas technology. By converting excess electric energy into hydrogen energy and storing the same, it solves the pain point that electric energy cannot be stored on a large scale for a long time. These characteristics of the electric-hydrogen energy system provide technical support for the large-scale integration of renewable energy featuring significant seasonality, intermittency and uncertainty into the power system. Therefore, the electric-hydrogen energy system has bright prospects in engineering applications and is receiving more and more attention.

The economic operation of electric-hydrogen energy system depends on the collaborative optimization of electric and hydrogen energy. On the one hand, the electric-hydrogen coupling makes the system operation very complex. On the other hand, the flexibility of the electric and hydrogen loads in the system, i.e., the ability to shift the loads within a certain period of time, brings extra flexibility to the operation of the system, but also makes the dispatching decision of the electric-hydrogen energy system a challenging problem. Without effective coordinated dispatching of electric and hydrogen energy flows, on the one hand, it may lead to a dispatch plan that is physically infeasible, posing a threat to the safe and stable operation of the system, and on the other hand, it will affect the economy of the operation of the system.

In view of the above problems, the designer, based on years of practical experience and expertise in engineering applications of such products, and with the application of theories, aims to design a dispatching method for electric-hydrogen energy systems that takes into account the flexible hydrogen demand, ensuring safe, efficient and economic operation of the system.

SUMMARY

It is an objective of the present invention to provide a dispatching method for an electric-hydrogen energy system considering flexible hydrogen demand, which can effectively solve the problem of coordination between electric and hydrogen energy flows, while taking into account the flexibility of electric and hydrogen loads, further providing additional flexibility to the operation of the system. With the proposed dispatching method, an economic and feasible dispatch plan of the electric-hydrogen integrated energy system is obtained to ensure the safe, efficient and economic operation of the system.

To this end, the present invention provides a dispatching method for an electric-hydrogen energy system considering flexible hydrogen demand, comprising:

establishing an electric load flexibility equation, a power purchase and sale constraint equation and a renewable energy output constraint equation based on the operating parameters of an electric power system;

establishing a hydrogen load flexibility equation and an electricity-to-hydrogen production safety operation constraint equation based on the operating parameters of an electricity-to-hydrogen production system;

establishing an electric power balance constraint equation using the electric power balance relationship between the electric power system and the electricity-to-hydrogen production system;

establishing an electric-hydrogen energy system dispatching model with the lowest operating cost of the electric-hydrogen energy system within the dispatching cycle as an objective function and using the electric load flexibility equation, the power purchase and sale constraint equation, the renewable energy output constraint equation, the hydrogen load flexibility equation, the electric-to-hydrogen production safety operation constraint equation and the electric power balance constraint equation as constraints; and solving the electric-hydrogen energy system dispatching model to obtain an optimal dispatching result.

Preferably, the operating parameters of the electric power system include network parameters, topology, electric load data and renewable energy output data of the electric power system, and the operating parameters of the electricity-to-hydrogen production system include network parameters, topology, hydrogen load data, equipment type and equipment capacity of the electricity-to-hydrogen production system.

Preferably, the expression of the objective function is:

$$\min \sum_{t=1}^{T}(c_t^{grid+} P_t^{grid+} - c_t^{grid-} P_t^{grid-} + c^{shift} P_t^{e,in});$$

where t represents the dispatching time period, T represents the dispatching cycle, $c_t^{grid+}$ represents the unit cost of power purchased by the electric power system from the grid during the time period t, $P_t^{grid+}$ represents the power that the electric power system grid-purchases from the grid during the time period t, $c_t^{grid-}$ represents the unit cost of power sold by the electric power system to the grid during the time period t, $P_t^{grid-}$ represents the shift power sold by the electric power system to the grid during the time period t, $c^{shift}$ represents the unit penalty cost to be paid to the user for the transfer of the electric load of the electric power system, and $P_t^{e,in}$ represents the electric load transferred in from other time periods by the electric power system during the time period t.

Preferably, the expression of the electric load flexibility equation is:

$$\begin{cases} P_t^e = P_t^{e,fix} + P_t^{e,in} - P_t^{e,out} \ \forall \ t = 1, 2, \ldots, T \\ 0 \leq P_t^{e,in} \leq P_t^{e,in,max} \ \forall \ t = 1, 2, \ldots, T \\ 0 \leq P_t^{e,out} \leq P_t^{e,out,max} \ \forall \ t = 1, 2, \ldots, T \\ \sum_{t=1}^{T} P_t^{e,in} = \sum_{t=1}^{T} P_t^{e,out} \end{cases} ;$$

where $P_t^e$ represents the total electric load of the electric power system during the time period t, $P_t^{e,fix}$ represents the fixed electric load of the electric power system during the time period t, $P_t^{e,out}$ represents the electric load transferred from the electric power system to other time periods during the time period t, $P_t^{e,in,max}$ represents the maximum value of the electric load that the electric power system can transfer in from other time periods in the time period t, and $P_t^{e,out,max}$ represents the maximum value of the electric load that the electric power system can transfer out to other time periods in the time period t.

Preferably, the expression of the power purchase and sale constraint equation is:

$$\begin{cases} 0 \leq P_t^{grid+} \leq \varepsilon_t^+ P_{max}^{grid} \ \forall \ t = 1, \ldots, T \\ 0 \leq P_t^{grid-} \leq \varepsilon_t^- P_{max}^{grid} \ \forall \ t = 1, \ldots, T \\ 0 \leq \varepsilon_t^+ + \varepsilon_t^- \leq 1 \ \forall \ t = 1, \ldots, T \\ \varepsilon_t^+, \varepsilon_t^- \in \{0, 1\} \ \forall \ t = 1, \ldots, T \end{cases} ;$$

where $\varepsilon_t^+$ represents the variables of the electric power system when purchasing power from the grid during the time period t, $\varepsilon_t^- \varepsilon_t^+$ represents the variables of the electric power system when selling power to the grid during the time period t, and $P_{max}^{grid}$ represents the maximum value of the electric power allowed to be exchanged between the electric power system and the grid.

Preferably, the expression of the renewable energy output constraint equation is:

$$0 \leq p_t^{PV} \leq p_{t,fore}^{PV} + \sigma_{t,fore} \cdot \varphi_a^{-1}(1-\eta) \ \forall \ t=1, \cdots, T;$$

where $p_t^{PV}$ represents the photovoltaic output dispatch value of the electric power system during the time period t, $p_{t,fore}^{PV}$ represents the photovoltaic output forecast value of the electric power system during the time period t, $\sigma_{t,fore}$ represents the standard deviation of the photovoltaic output forecast value of the electric power system during the time period t, $\varphi_a^{-1}(\cdot)$ represents the inverse cumulative distribution function of the standard normal distribution N(0,1) and $\eta$ represents the confidence level of the photovoltaic forecast value.

Preferably, the expression of the hydrogen load flexibility equation is:

$$\sum_{t=T_h \times (k-1)+1}^{T_h \times k} P_t^h = P_{total,k}^h, \ \forall \ k = 1, \ldots, T/T_h;$$

where $T_h$ represents the length of the supply-demand balance cycle required by the hydrogen load of the electricity-to-hydrogen production system, k represents the sequence of the supply-demand balance cycle of the hydrogen load of the electricity-to-hydrogen production system, $P_t^h$ represents the hydrogen load of the users of the electricity-to-hydrogen production system during the time period t; and $P_{total,k}^h$ represents the hydrogen demand required by the users of the electricity-to-hydrogen production system during the $k^{th}$ supply-demand balance cycle.

Preferably, the expression of the electricity-to-hydrogen production safety operation constraint equation is $$\begin{cases} \eta^{P2H} P_t^{P2H} = P_t^h \ \forall \ t = 1, \ldots, T \\ \lambda \varepsilon_t^{P2H} C^{P2H} \leq P_t^{P2H} \leq \varepsilon_t^{P2H} C^{P2H} \ \forall \ t = 1, \ldots, T; \\ \varepsilon_t^{P2H} \in \{0, 1\} \ \forall \ t = 1, \ldots, T \end{cases}$$

Where $\eta^{P2H}$ represents the conversion efficiency of the electricity-to-hydrogen production equipment, $P_t^{P2H}$ represents the electric power consumed by the electricity-to-hydrogen production equipment during the time period t, $\lambda$ represents the minimum load level of the electricity-to-hydrogen production equipment, $\varepsilon_t^{P2H}$ represents the operating state of the electricity-to-hydrogen production equipment during the time period t, and $C^{P2H}$ represents the capacity of the electricity-to-hydrogen production equipment.

Preferably, the expression of the electric power balance constraint equation is:

$$P_t^{grid+} - P_t^{grid-} + P_t^{PV} - P_t^{P2H} = P_t^e.$$

Preferably, solving the electric-hydrogen energy system dispatching model to obtain an optimal dispatching result includes:

solving the electric-hydrogen energy system dispatching model using a mixed integer linear programming method to obtain the optimal dispatching result.

The present invention has at least the following beneficial effects.

By establishing an electric load flexibility equation, a power purchase and sale constraint equation, a renewable energy output constraint equation, a hydrogen load flexibility equation, an electricity-to-hydrogen production safety operation constraint equation and an electric power balance constraint equation, establishing an electric-hydrogen energy system dispatching model with the lowest operating cost of the electric-hydrogen energy system within the dispatching cycle as an objective function, and solving the electric-hydrogen energy system dispatching model to obtain an optimal dispatching result, the present invention can provide additional flexibility to the operation of the electric-hydrogen energy system to improve the economy of the system operation as it fully considers the flexibility of electric and hydrogen loads. As compared with the prior art, the present invention effectively solves the problem of coordination between electric and hydrogen energy flows, while taking into account the flexibility of electric and hydrogen loads, further providing additional flexibility to the operation of the system. With the proposed dispatching method, an economic and feasible dispatch plan of the electric-hydrogen integrated energy system is obtained to ensure the safe, efficient and economic operation of the system.

DESCRIPTION OF THE DRAWINGS

In order to more clearly illustrate the embodiments of the invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

DETAILED DESCRIPTION

The technical solutions in the embodiments of the present invention will be described clearly and completely in conjunction with the accompanying drawings in the embodiments of the present invention. Obviously, the described embodiments are only a part of the embodiments of the present invention, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical," "horizontal," "left," "right," and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Figure 1:
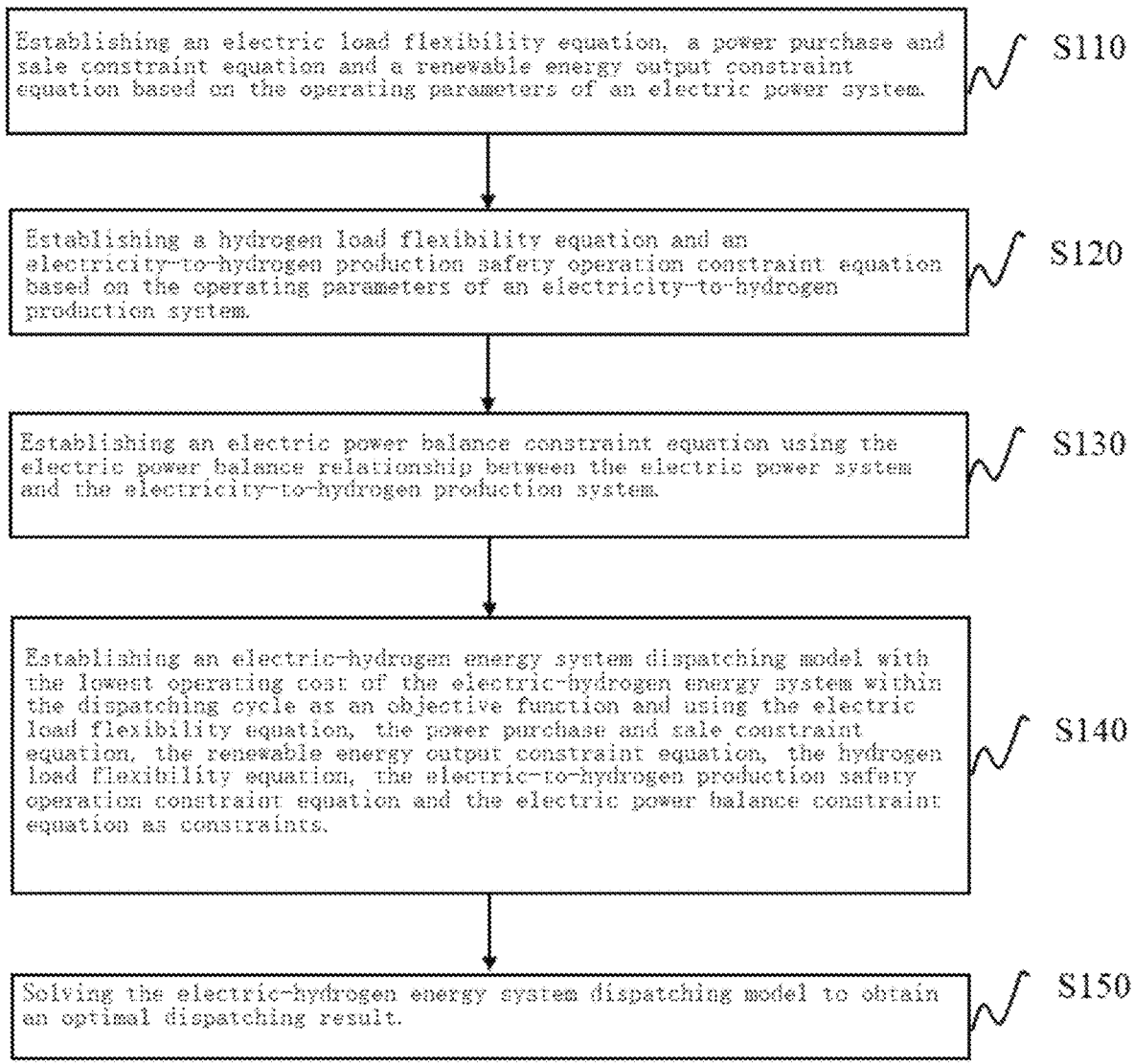
FIG. 1 is a schematic flowchart of a dispatching method for electric-hydrogen energy system considering flexible hydrogen demand according to an embodiment of the present invention.

As shown in FIG. 1, an embodiment of the present invention provides a dispatching method for electric-hydrogen energy system considering flexible hydrogen demand, the method comprising the following steps.

Step S110 consists of establishing an electric load flexibility equation, a power purchase and sale constraint equation and a renewable energy output constraint equation based on the operating parameters of an electric power system.

In the embodiment of the present invention, the electric load in the electric-hydrogen energy system has certain flexibility. The electric load can be transferred in a certain period of time, for example, the electric load in the current time period can be transferred out to other time periods, or transferred from other time periods to the current time period. An electric load flexibility equation can be established based on the operation parameters of the electric power system. At the same time, the electric-hydrogen energy system can exchange electric power with the upper-level grid to purchase or sell electricity from or to the upper-level grid. A power purchase and sale constraint equation can be established based on the operating parameters of the electric power system. In addition, the electric-hydrogen energy system can generate power through renewable energy such as wind power and photovoltaic. A renewable energy output constraint equation can be established based on the operating parameters of the electric power system.

In specific implementation, the operating parameters of the electric power system include network parameters, topology, electric load data and renewable energy output data of the electric power system.

Step S120 consists of establishing a hydrogen load flexibility equation and an electricity-to-hydrogen production safety operation constraint equation based on the operating parameters of an electricity-to-hydrogen production system.

In the embodiment of the invention, the hydrogen load in the electric-hydrogen energy system also has certain flexibility. In the supply-demand balance cycle, the hydrogen demand of the users in different time periods varies. A hydrogen load flexibility equation can be established based on the operating parameters of the electricity-to-hydrogen production system. At the same time, the electricity-to-hydrogen production equipment is subject to the safety constraints of the electricity-to-hydrogen production system. An electricity-to-hydrogen production safety operation constraint equation can be established based on the operation parameters of the electricity-to-hydrogen production system.

In specific implementation, the operating parameters of the electricity-to-hydrogen production system include network parameters, topology, hydrogen load data, equipment type and equipment capacity of the electricity-to-hydrogen production system.

Step S130 consists of establishing an electric power balance constraint equation using the electric power balance relationship between the electric power system and the electricity-to-hydrogen production system.

In the embodiment of the invention, the electric power of the electric power system and the electric power of the electricity-to-hydrogen production system in the electric-hydrogen energy system have a certain balance relationship, therefore an electric power balance constraint equation can be established accordingly.

Step S140 consists of establishing an electric-hydrogen energy system dispatching model with the lowest operating cost of the electric-hydrogen energy system within the dispatching cycle as an objective function and using the electric load flexibility equation, the power purchase and sale constraint equation, the renewable energy output constraint equation, the hydrogen load flexibility equation, the electric-to-hydrogen production safety operation constraint equation and the electric power balance constraint equation as constraints.

In the embodiment of the present invention, an electric-hydrogen energy system dispatching model is established with the lowest operating cost of the electric-hydrogen energy system within the dispatching cycle as an objective function and using the constraint equations established in the above steps as constraints. In specific implementation, the electric-hydrogen energy system dispatching model may be a mixed integer linear programming model.

Step S150 consists of solving the electric-hydrogen energy system dispatching model to obtain an optimal dispatching result.

In the embodiment of the present invention, the objective function of the electric-hydrogen energy system dispatching model is solved under the premise that the constraints established in the above steps are satisfied, and the optimal dispatching result of the electric-hydrogen energy system can be finally obtained.

As described above, by establishing an electric load flexibility equation, a power purchase and sale constraint equation, a renewable energy output constraint equation, a hydrogen load flexibility equation, an electricity-to-hydrogen production safety operation constraint equation and an electric power balance constraint equation, establishing an electric-hydrogen energy system dispatching model with the lowest operating cost of the electric-hydrogen energy system within the dispatching cycle as an objective function, and solving the electric-hydrogen energy system dispatching model to obtain an optimal dispatching result, the dispatching method for electric-hydrogen energy system considering flexible hydrogen demand provided by the embodiments of the present invention can provide additional flexibility to the operation of the electric-hydrogen energy system to improve the economy of the system operation as it fully considers the flexibility of electric and hydrogen loads. As compared with the prior art, the present invention effectively solves the problem of coordination between electric and hydrogen energy flows, while taking into account the flexibility of electric and hydrogen loads, further providing additional flexibility to the operation of the system. With the proposed dispatching method, an economic and feasible dispatch plan of the electric-hydrogen integrated energy system is obtained to ensure the safe, efficient and economic operation of the system.

Specifically, in the above embodiment, the expression of the objective function is:

$$\min \sum_{t=1}^{T} \left( c_t^{grid+} P_t^{grid+} - c_t^{grid-} P_t^{grid-} + c^{shift} P_t^{e,in} \right);$$

where t represents the dispatching time period, T represents the dispatching cycle, $c_t^{grid+}$ represents the unit cost of power purchased by the electric power system from the grid during the time period t, $P_t^{grid+}$ represents the power that the electric power system grid-purchases from the grid during the time period t, $c_t^{grid-}$ represents the unit cost of power sold by the electric power system to the grid during the time period t, $P_t^{grid-}$ represents the power sold by the electric power system to the grid during the time period t, $c^{shift}$ represents the unit penalty cost to be paid to the user for the transfer of the electric load of the electric power system, and $P_t^{e,in}$ represents the electric load transferred in from other time periods by the electric power system during the time period t.

In the embodiment of the present invention, the optimization objective of the operation dispatching of the electric-hydrogen energy system is the lowest operating cost during the dispatching cycle, and the optimization variables include the power $P_t^{grid+}$ of the system to purchase power from the grid at each time period, the power $P_t^{grid-}$ of the system to sell power to the grid at each time period, and the electrical load $P_t^{e,in}$ transferred from other time periods to the system in each time period.

Specifically, in the above embodiment, the expression of the electric load flexibility equation is:

$$\begin{cases} P_t^e = P_t^{e,fix} + P_t^{e,in} - P_t^{e,out} \ \forall \ t = 1, 2, \ldots, T \\ 0 \le P_t^{e,in} \le P_t^{e,in,max} \ \forall \ t = 1, 2, \ldots, T \\ 0 \le P_t^{e,out} \le P_t^{e,out,max} \ \forall \ t = 1, 2, \ldots, T \\ \sum_{t=1}^{T} P_t^{e,in} = \sum_{t=1}^{T} P_t^{e,out} \end{cases} ;$$

where $P_t^e$ represents the total electric load of the electric power system during the time period t, $P_t^{e,fix}$ represents the fixed electric load of the electric power system during the time period t, $P_t^{e,out}$ represents the electric load transferred from the electric power system to other time periods during the time period t, $P_t^{e,in,max}$ represents the maximum value of the electric load that the electric power system can transfer in from other time periods during the time period t, and $P_t^{e,out,max}$ represents the maximum value of the electric load that the electric power system can transfer out to other time periods during the time period t.

In the embodiment of the present invention, when the electric-hydrogen energy system transfers the electric load within a certain period of time, the electric load $P_t^{e,in}$ transferred in from other time periods and the electric load $P_t^{e,out}$ transferred out to other time periods are subject to certain restrictions, that is, the flexibility of the electric load in the electric-hydrogen energy system is constrained by the above electric load flexibility equation.

Specifically, in the above embodiment, the expression of the power purchase and sale constraint equation is:

$$\begin{cases} 0 \le P_t^{grid+} \le \varepsilon_t^+ P_{max}^{grid} \ \forall \ t = 1, \ldots, T \\ 0 \le P_t^{grid-} \le \varepsilon_t^- P_{max}^{grid} \ \forall \ t = 1, \ldots, T \\ 0 \le \varepsilon_t^+ + \varepsilon_t^- \le 1 \ \forall \ t = 1, \ldots, T \\ \varepsilon_t^+, \varepsilon_t^- \in \{0, 1\} \ \forall \ t = 1, \ldots, T \end{cases} ;$$

where $\varepsilon_t^+$ represents the variables of the electric power system when purchasing power from the grid during the time period t, $\varepsilon_t^- \varepsilon_t^+$ represents the variables of the electric power system when selling power to the grid during the time period t, and $P_{max}^{grid}$ represents the maximum value of the electric power allowed to be exchanged between the electric power system and the grid.

In the embodiment of the invention, when the electric-hydrogen energy system exchanges electric power with the upper-level grid, the power $P_t^{grid+}$ purchased from and the power $P_t^{grid-}$ sold to the upper-level grid within a certain period of time is limited by the maximum value of electric power allowed to be exchanged between the system and the grid, that is, the purchase and sale of power from and to the upper-level grid is constrained by the above power purchase and sale constraint equation.

Specifically, in the above embodiment, the expression of the renewable energy output constraint equation is:

$$0 \le p_t^{PV} \le p_{t,fore}^{PV} + \sigma_{t,fore} \cdot \varphi_a^{-1}(1-\eta) \forall t=1, \cdots, T;$$

where $p_t^{PV}$ represents the photovoltaic output dispatch value of the electric power system during the time period t, $P_{t,fore}^{PV}$ represents the photovoltaic output forecast value of the electric power system during the time period t, $\sigma_{t,fore}$ represents the standard deviation of the photovoltaic output forecast value of the electric power system during the time period t, $\varphi_a^{-1}(\cdot)$ represents the inverse cumulative distribution function of the standard normal distribution N(0,1), and η represents the confidence level of the photovoltaic forecast value.

In the embodiment of the present invention, the renewable energy in the electric-hydrogen energy system is mainly photovoltaic, and the output dispatching value $p_t^{PV}$ of photovoltaic in a certain period of time is limited by the photovoltaic power generation itself, that is, the renewable energy output in the electric-hydrogen energy system is constrained by the above renewable energy output constraint equation.

Specifically, in the above embodiment, the expression of the hydrogen load flexibility equation is:

$$\sum_{t=T_h\times(k-1)+1}^{T_h\times k} P_t^h = P_{total,k}^h, \forall k = 1, \ldots, T/T_h;$$

where $T_h$ represents the length of the supply-demand balance cycle required by the hydrogen load of the electricity-to-hydrogen production system, k represents the sequence of the supply-demand balance cycle of the hydrogen load of the electricity-to-hydrogen production system, $P_t^h$ represents the hydrogen load of the users of the electricity-to-hydrogen production system during the time period t; and $P_{total,k}^h$ represents the hydrogen demand required by the users of the electricity-to-hydrogen production system during the $k^{th}$ supply-demand balance cycle.

In the embodiment of the present invention, the fluctuation of the hydrogen load $P_t^h$ of the users of the electric-hydrogen energy system in the supply-demand balance cycle is somewhat limited in a certain period of time, that is, the flexibility of the hydrogen load in the electric-hydrogen energy system is constrained by the above hydrogen load flexibility equation.

Specifically, in the above embodiment, the expression of the electricity-to-hydrogen production safety operation constraint equation is:

$$\begin{cases} \eta^{P2H} P_t^{P2H} = P_t^h \forall t = 1, \ldots, T \\ \lambda \varepsilon_t^{P2H} C^{P2H} \le P_t^{P2H} \le \varepsilon_t^{P2H} C^{P2H} \forall t = 1, \ldots, T; \\ \varepsilon_t^{P2H} \in \{0,1\} \forall t = 1, \ldots, T \end{cases}$$

where $\eta^{P2H}$ represents the conversion efficiency of the electricity-to-hydrogen production equipment, $P_t^{P2H}$ represents the electric power consumed by the electricity-to-hydrogen production equipment during the time period t, λ represents the minimum load level of the electricity-to-hydrogen production equipment, $\varepsilon_t^{P2H}$ represents the operating state of the electricity-to-hydrogen production equipment during the time period t, and $C^{P2H}$ represents the capacity of the electricity-to-hydrogen production equipment.

In the embodiment of the present invention, the electric power $P_t^{P2H}$ consumed by the electricity-to-hydrogen production equipment of the electric-hydrogen energy system in a certain period of time is subject to the safety constraints of the electricity-to-hydrogen production system, that is, the safe operation of the electric-hydrogen energy system is constrained by the above electricity-to-hydrogen production safety operation constraint equation.

Specifically, in the above embodiment, the expression of the electric power balance constraint equation is:

$$P_t^{grid+} - P_t^{grid-} + P_t^{PV} - P_t^{P2H} = P_t^e.$$

In the embodiment of the present invention, there is a balance relationship between the power $P_t^{grid+}$ purchased from the upper-level grid, the power $P_t^{grid-}$ sold to the upper-level grid, the photovoltaic output dispatch value $p_t^{PV}$, the electric power $P_t^{P2H}$ consumed by the electricity-to-hydrogen production equipment and the total electric load $P_t^e$ of the electric hydrogen energy system within a certain period of time, which is constrained by the above electric power balance constraint equation.

As a preferred embodiment, the step S150 includes:
solving the electric-hydrogen energy system dispatching model using a mixed integer linear programming method to obtain the optimal dispatching result.

It should be noted that the solving methods of optimization problems are mainly divided into two categories: heuristic methods and mathematical optimization methods. In the embodiment of the present invention, the established electric-hydrogen energy system dispatching model is a mixed integer linear programming model, which belongs to a mixed-integer linear programming problem that can be solved by solvers such as Cplex, Gurobi, etc., to obtain the optimal dispatching result of the electric-hydrogen energy system.

In the following, the advantages of the dispatching method for electric-hydrogen energy system considering flexible hydrogen demand provided by the embodiments of the present invention are verified in terms of economics in combination with specific cases.

Figure 2:
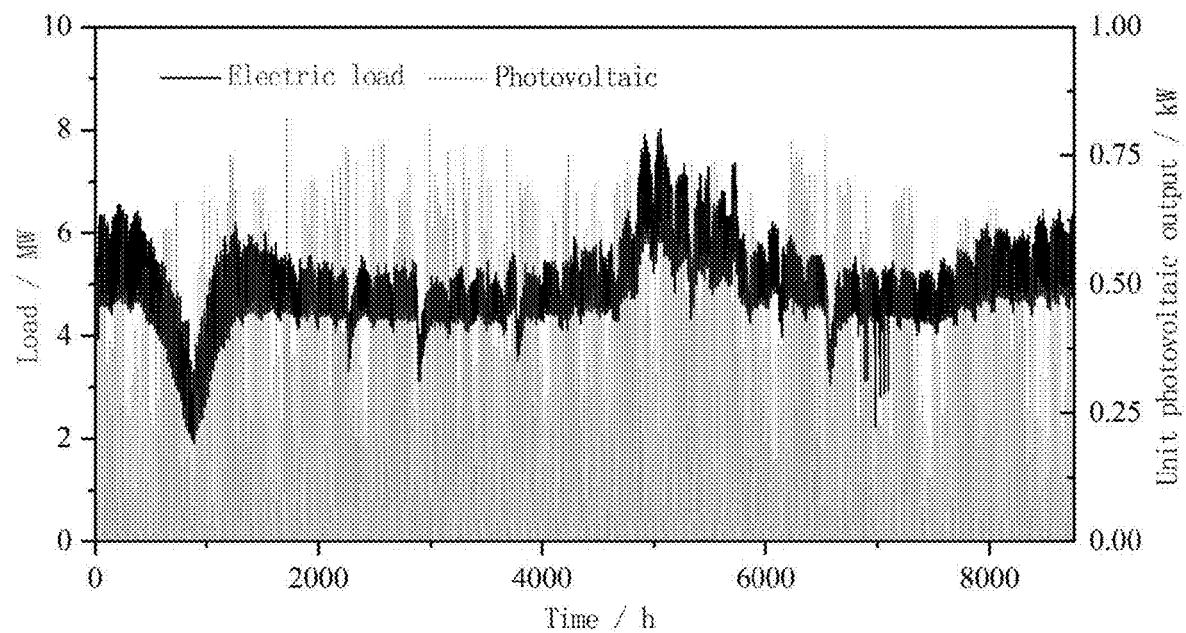
FIG. 2 is a schematic diagram of electrical load and unit photovoltaic output in a typical electric-hydrogen energy system according to an embodiment of the present invention.

The dispatching cycle was set to 1 year and the time interval to 1 h. In order to make the simulation results more practical, the hourly annual power load curve of a certain area along the east coast of China is collected as the electric load data, and the hourly annual unit PV power generation data is calculated by using the PVWatts Calculator developed by the National Renewable Energy Laboratory. The electric load and unit PV output are shown in FIG. 2.

In addition, the electricity-to-hydrogen conversion efficiency of the electric-hydrogen production equipment was set to 0.613 (i.e., 54.3 kMh of electricity is consumed for every 1 kg of hydrogen produced), the capacity of the equipment to 2 MW, and the minimum load level to 0.1.

The time scales of hydrogen supply for the flexible hydrogen load were set to 1 h, 6 h, 12 h, 24 h and 168 h, corresponding to hydrogen demand of 12.5 kg/h, 75.0 kg/6 h, 150.0 kg/12 h, 300.0 kg/24 h and 2100.0 kg/168 h, respectively, to study the effect of hydrogen demand on the electro-hydrogen energy system from hourly to weekly scales. In order to verify the advantages of the proposed method of the present invention in terms of economics, the comparison of system economics for different flexible hydrogen demands with a photovoltaic configuration capacity of 20 MW is shown in FIG. 3.

Figure 3:
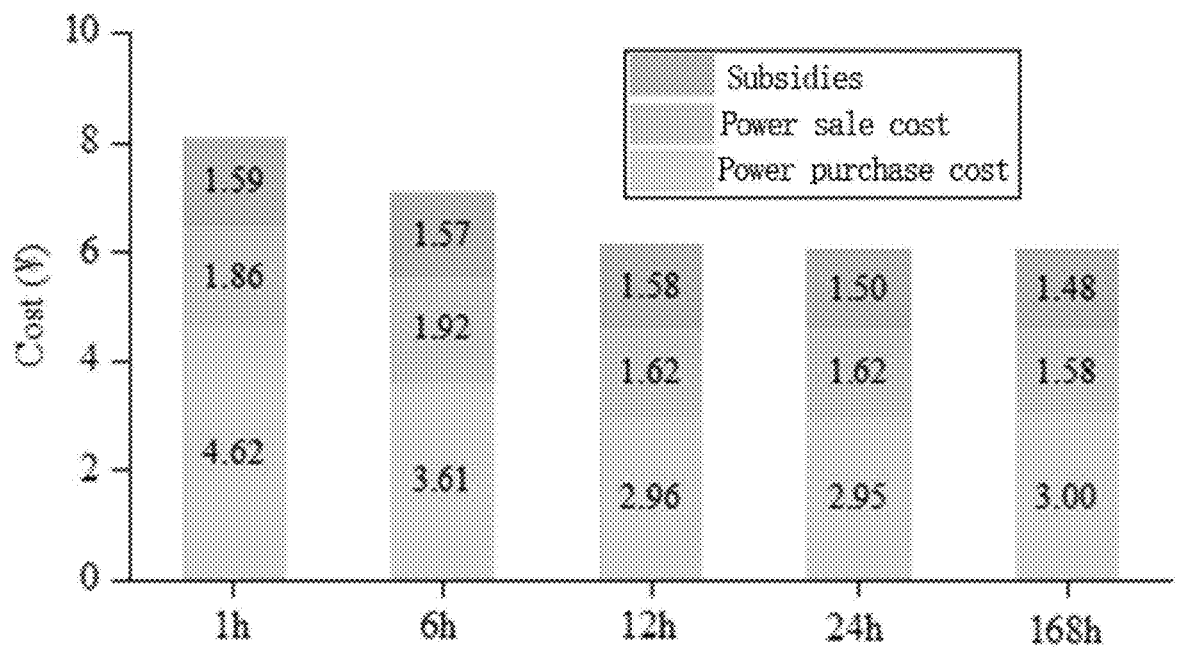
FIG. 3 is a comparison diagram of system economy under different hydrogen load flexibilities using the dispatching method for electric-hydrogen energy system considering flexible hydrogen demand according to an embodiment of the present invention.

As can be seen in FIG. 3, the annual system operating cost decreases with increasing hydrogen supply time scale for different photovoltaic configuration capacities. Specifically, as the time scale goes from 1 h to 6 h, the power purchase cost of the system is greatly reduced under different photovoltaic configuration capacities, which in turn reduces the total system cost. With the time scale from 6 h to 168 h, the cost reduction of the system gradually slows down with little change in the later period. The above results show that as the time scale of flexible hydrogen demand increases, the system power purchase costs, power sale cost and subsidy cost all gradually decrease, which helps to alleviate the dependence on the upper-level grid and the demand-side response, and at the same time verifies the advantages of the dispatching method proposed in the embodiments of the present invention in terms of operational economy.

Figure 4:
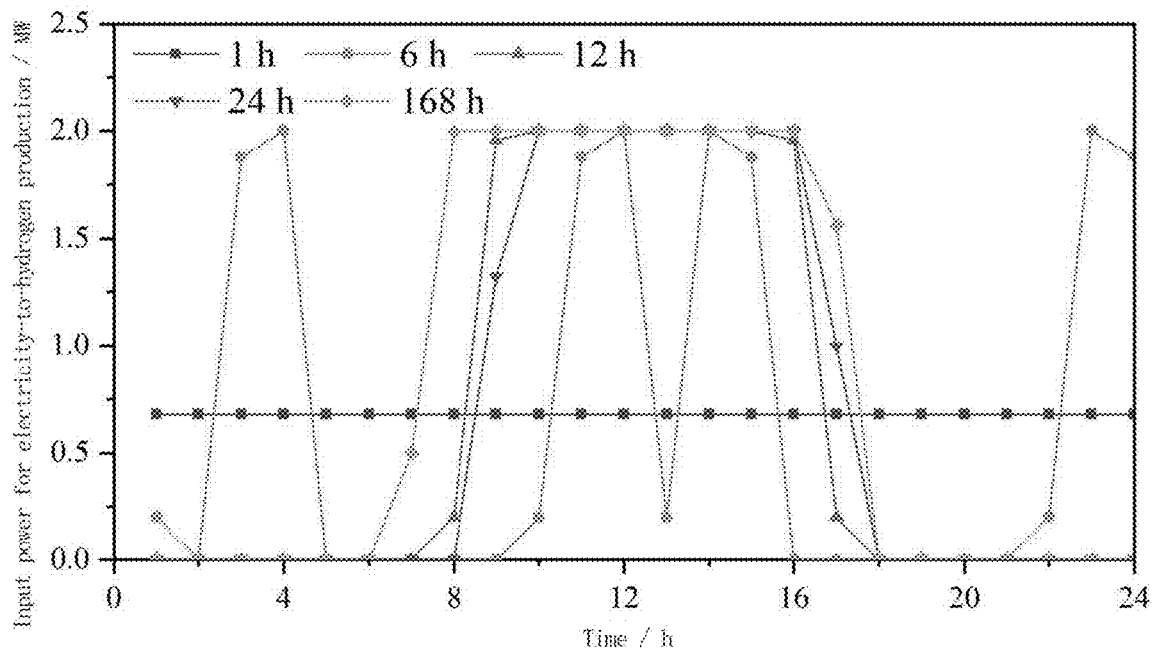
FIG. 4 is a schematic flowchart of the input electric power of the electricity-to-hydrogen production equipment under different hydrogen load flexibilities using the dispatching method for electric-hydrogen energy system considering flexible hydrogen demand according to an embodiment of the present invention.

Reference is made to FIG. 4, which illustrates the results of input electric power of the electricity-to-hydrogen production equipment under different hydrogen load flexibilities. It can be seen that in the 1 h hydrogen demand constraint, the electricity-to-hydrogen production equipment needs to maintain constant power operation to meet the real-time hydrogen demand. When the hydrogen load balancing period is increased to 6 h, the operational flexibility of the electricity-to-hydrogen production equipment is rapidly improved, and it mainly works during the dispatching cycle of 3:00-4:00, 11:00-12:00, 14:00-15:00 and 23:00-24:00 when the electricity price is low and the photovoltaic output is high, so the system economy is improved. However, the electric hydrogen plant starts and stops too frequently (three times in one day). With the further increase of the hydrogen load balance cycle, the electricity-to-hydrogen production equipment further focuses on working at the rated power during the noon period, and only starts and stops once in a typical day.

Figure 5:
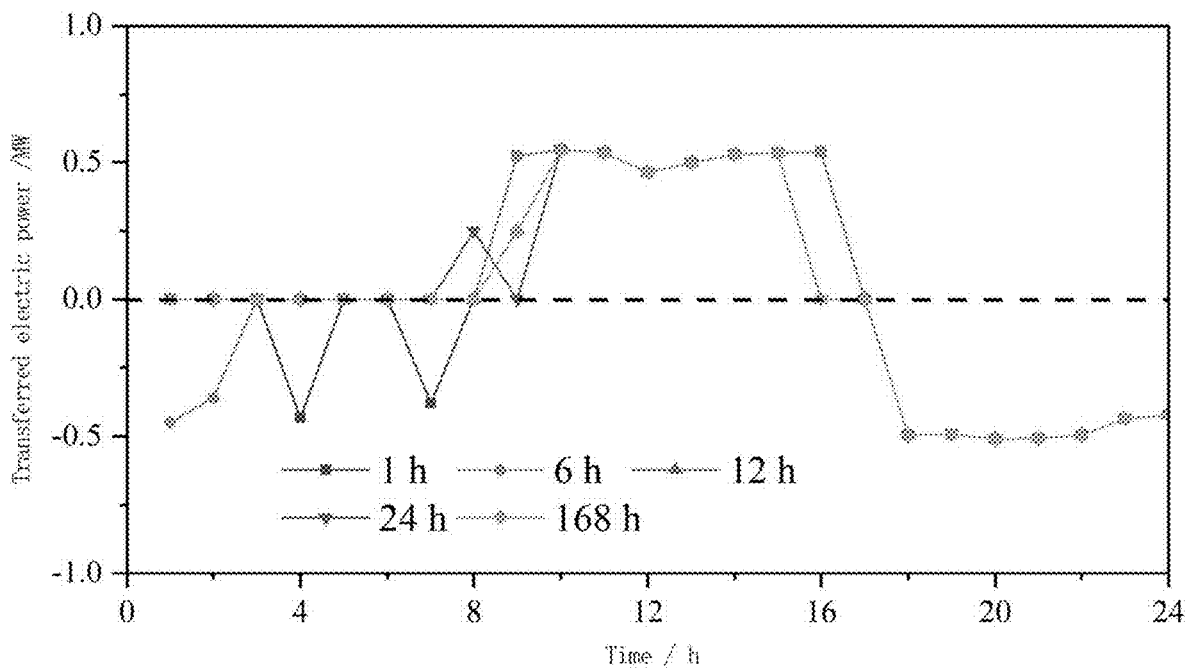
FIG. 5 is a schematic flowchart of system electric load transfer under different hydrogen load flexibilities using the dispatching method for electric-hydrogen energy system considering flexible hydrogen demand according to an embodiment of the present invention.

Reference is made to FIG. 5, which illustrates the results of electric load transfer under different hydrogen load flexibilities. It can be seen that under different hydrogen load balance cycles, the system mainly transfers the electric load demand in other time periods to the peak photovoltaic output period from 8:00 to 17:00, and it can be found from the demand-side response curve that the fluctuation is the largest when the hydrogen load balance cycle is 1H, and then the fluctuation becomes smaller and smaller with the increase of time scale. It can be found from the above results that with the gradual increase of hydrogen load balance cycle (gradual enhancement of terminal storage capacity), the system is significantly effective in terms of equipment operation, trading with the upper-level grid and demand-side response.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A dispatching method for an electric-hydrogen energy system considering flexible hydrogen demand, comprising:
providing the electric-hydrogen energy system;
establishing an electric load flexibility equation, a power purchase and sale constraint equation and a renewable energy output constraint equation based on the operating parameters of an electric power system;
establishing a hydrogen load flexibility equation and an electricity-to-hydrogen production safety operation constraint equation based on the operating parameters of an electricity-to-hydrogen production system;
establishing an electric power balance constraint equation using the electric power balance relationship between the electric power system and the electricity-to-hydrogen production system;
establishing an electric-hydrogen energy system dispatching model with the lowest operating cost of the electric-hydrogen energy system within the dispatching cycle as an objective function and using the electric load flexibility equation, the power purchase and sale constraint equation, the renewable energy output constraint equation, the hydrogen load flexibility equation, the electric-to-hydrogen production safety operation constraint equation and the electric power balance constraint equation as constraints;
solving the electric-hydrogen energy system dispatching model to obtain an optimal dispatching result, wherein the optimal dispatching result is used to dispatch the electric-hydrogen energy system; and
considering a flexibility of electric and hydrogen loads, providing flexibility to an operation of the electric-hydrogen energy system and improving an efficiency of the electric-hydrogen energy system,
wherein the expression of the objective function is:

$$\min \sum_{t=1}^{T} \left( c_t^{grid+} P_t^{grid+} - c_t^{grid-} P_t^{grid-} + c^{shift} P_t^{e,in} \right);$$

where t represents the dispatching time period, T represents the dispatching cycle, $c_t^{grid+}$ represents the unit cost of power purchased by the electric power system from the grid during the time period t, t $P_t^{grid+}$ represents the power that the electric power system purchases from the grid during the time period t, $c_t^{grid-}$ represents the unit cost of power sold by the electric power system to the grid during the time period t, $P_t^{grid-}$ represents the power sold by the electric power system to the grid during the time period t, $c^{shift}$ represents the unit penalty cost to be paid to the user for the transfer of the electric load of the electric power system, and $P_t^{e,in}$ represents the electric load transferred in from other time periods by the electric power system during the time period t;

wherein the expression of the electric load flexibility function is:

$$\begin{cases} P_t^e = P_t^{e,fix} + P_t^{e,in} - P_t^{e,out} \ \forall\ t = 1, 2, \ldots, T \\ 0 \le P_t^{e,in} \le P_t^{e,in,max} \ \forall\ t = 1, 2, \ldots, T \\ 0 \le P_t^{e,out} \le P_t^{e,out,max} \ \forall\ t = 1, 2, \ldots, T \\ \sum_{t=1}^{T} P_t^{e,in} = \sum_{t=1}^{T} P_t^{e,out} \end{cases};$$

where $P_t^e$ represents the total electric load of the electric power system during the time period t, $P_t^{e,fix}$ represents the fixed electric load of the electric power system during the time period t, $P_t^{e,out}$ represents the electric load transferred from the electric power system to other time periods during the time period t, $P_t^{e,in,max}$ represents the maximum value of the electric load that the electric power system can transfer in from other time periods in the time period t, and $P_t^{e,out,max}$ represents the maximum value of the electric load that the electric power system can transfer out to other time periods in the time period t;

wherein the expression of the power purchase and sale constraint equation is:

$$\begin{cases} 0 \le P_t^{grid+} \le \varepsilon_t^+ P_{max}^{grid} \forall t = 1, \ldots, T \\ 0 \le P_t^{grid-} \le \varepsilon_t^- P_{max}^{grid} \forall t = 1, \ldots, T \\ 0 \le \varepsilon_t^+ + \varepsilon_t^- \le 1 \forall t = 1, \ldots, T \\ \varepsilon_t^+, \varepsilon_t^- \in \{0, 1\} \forall t = 1, \ldots, T \end{cases};$$

where $\varepsilon_t^+$ represents the variables of the electric power system when purchasing power from the grid during the time period t, $\varepsilon_t^- \varepsilon_t^+$ represents the variables of the electric power system when selling power to the grid during the time period t, and $P_{max}^{grid}$ represents the maximum value of the electric power allowed to be exchanged between the electric power system and the grid;

wherein the expression of the renewable energy output constraint equation is:

$$0 \le p_t^{PV} \le p_{t,fore}^{PV} + \sigma_{t,fore} \cdot \varphi_a^{-1}(1-\eta) \forall t = 1, \cdots, T;$$

where $p_t^{PV}$ represents the photovoltaic output dispatch value of the electric power system during the time period t, $p_{t,fore}^{PV}$ represents the photovoltaic output forecast value of PV the electric power system during the time period t, $\sigma_{t,fore}$ represents the standard deviation of the photovoltaic output forecast value of the electric power system during the time period t, $\varphi_a^{-1}(\cdot)$ a represents the inverse cumulative distribution function of the standard normal distribution N(0,1) and $\eta$ represents the confidence level of the photovoltaic forecast value;

wherein the expression of the hydrogen load flexibility equation is:

$$\sum_{t=T_h \times (k-1)+1}^{T_h \times k} P_t^h = P_{total,k}^h, \forall k = 1, \ldots, T/T_h;$$

where $T_h$ represents the length of the supply-demand balance cycle required by the T hydrogen load of the electricity-to-hydrogen production system, k represents the sequence of the supply-demand balance cycle of the hydrogen load of the electricity-to-hydrogen production system, $P_t^h$ represents the hydrogen load of the users of the electricity-to-hydrogen production system during the time period t; and $P_{total,k}^h$ represents the hydrogen demand required by the users of the electricity-to-hydrogen production system during the $k^{th}$ supply-demand balance cycle;

wherein the expression of the electricity-to-hydrogen production safety operation constraint equation is:

$$\begin{cases} \eta^{P2H} P_t^{P2H} = P_t^h \forall t = 1, \ldots, T \\ \lambda \varepsilon_t^{P2H} C^{P2H} \le P_t^{P2H} \le \varepsilon_t^{P2H} C^{P2H} \forall t = 1, \ldots, T \\ \varepsilon_t^{P2H} \in \{0, 1\} \forall t = 1, \ldots, T \end{cases};$$

where $\eta^{P2H}$ represents the conversion efficiency of the electricity-to-hydrogen production equipment, $P_t^{P2H}$ represents the electric power consumed by the electricity-to-hydrogen production equipment during the time period t, $\lambda$ represents the minimum load level of the electricity-to-hydrogen production equipment, $\varepsilon_t^{P2H}$ represents the operating state of the electricity-to-hydrogen production equipment during the time period t, and $C^{P2H}$ represents the capacity of the electricity-to-hydrogen production equipment; and wherein the expression of the electric power balance constraint equation is:

$$P_t^{grid+} - P_t^{grid-} + P_t^{PV} - P_t^{P2H} = P_t^e.$$

2. The dispatching method for an electric-hydrogen energy system considering flexible hydrogen demand according to claim 1, wherein the operating parameters of the electric power system include network parameters, topology, electric load data and renewable energy output data of the electric power system, and the operating parameters of the electricity-to-hydrogen production system include network parameters, topology, hydrogen load data, equipment type and equipment capacity of the electricity-to-hydrogen production system.

3. The dispatching method for an electric-hydrogen energy system considering flexible hydrogen demand according to claim 1, wherein solving the electric-hydrogen energy system dispatching model to obtain an optimal dispatching result includes:
solving the electric-hydrogen energy system dispatching model using a mixed integer linear programming method to obtain the optimal dispatching result.

* * * * *